United States Patent
Bukovinszky et al.

(10) Patent No.: US 8,633,406 B2
(45) Date of Patent: Jan. 21, 2014

(54) MOISTURE RESISTANT CORD PLATE FOR A PHOTOVOLTAIC MODULE

(75) Inventors: George Bukovinszky, Waterville, OH (US); Brian E. Cohen, Perrysburg, OH (US); Raymond Domsic, Grosse Ile, MI (US); James J. Poddany, Northwood, OH (US)

(73) Assignee: First Solar, Inc., Perrysburg, OH (US)

( * ) Notice: Subject to any disclaimer, the term of this patent is extended or adjusted under 35 U.S.C. 154(b) by 274 days.

(21) Appl. No.: 13/172,385

(22) Filed: Jun. 29, 2011

(65) Prior Publication Data

US 2012/0000524 A1 Jan. 5, 2012

Related U.S. Application Data

(60) Provisional application No. 61/360,256, filed on Jun. 30, 2010.

(51) Int. Cl.
*H05K 7/14* (2006.01)
*H02G 3/02* (2006.01)

(52) U.S. Cl.
USPC .......................................... 174/535; 174/655

(58) Field of Classification Search
USPC .......................................... 174/535, 549, 655
See application file for complete search history.

(56) References Cited

U.S. PATENT DOCUMENTS

| | | |
|---|---|---|
| 5,280,133 A | 1/1994 | Nath |
| 6,066,797 A | 5/2000 | Toyomura et al. |
| 7,449,629 B2 | 11/2008 | Ferri et al. |
| 7,534,956 B2 | 5/2009 | Kataoka et al. |
| 2006/0180196 A1 | 8/2006 | Lares et al. |
| 2006/0207646 A1 | 9/2006 | Terreau et al. |
| 2008/0092952 A1 | 4/2008 | Chen et al. |
| 2010/0018572 A1* | 1/2010 | Grimberg et al. ............ 174/520 |
| 2010/0170715 A1* | 7/2010 | Grimberg et al. ............ 174/547 |
| 2010/0218797 A1* | 9/2010 | Coyle et al. .................... 136/243 |
| 2010/0252098 A1 | 10/2010 | Cohen et al. |
| 2010/0319985 A1* | 12/2010 | Trimpe ......................... 174/520 |
| 2011/0035922 A1 | 2/2011 | Murphy |
| 2011/0061712 A1 | 3/2011 | Cohen et al. |
| 2011/0100669 A1 | 5/2011 | Lee et al. |
| 2011/0114149 A1 | 5/2011 | Li |
| 2011/0147076 A1* | 6/2011 | Chen et al. .................... 174/520 |
| 2012/0048614 A1* | 3/2012 | Xue et al. ...................... 174/520 |
| 2012/0060919 A1* | 3/2012 | Mills et al. .................... 136/259 |
| 2012/0125682 A1* | 5/2012 | Lu et al. ........................ 174/548 |
| 2012/0205149 A1* | 8/2012 | Lenel ............................ 174/547 |
| 2012/0292098 A1* | 11/2012 | Kinzl et al. ................... 174/520 |

FOREIGN PATENT DOCUMENTS

| | | |
|---|---|---|
| EP | 1 729 369 A2 | 12/2006 |
| JP | 9-55520 A | 2/1997 |
| JP | 2003-17732 A | 1/2003 |
| WO | WO 2009/129405 A2 | 10/2009 |
| WO | WO 2010/014941 A1 | 2/2010 |
| WO | WO 2010/052207 A2 | 5/2010 |
| WO | WO 2011/046513 A1 | 4/2011 |

* cited by examiner

*Primary Examiner* — Jinhee Lee
(74) *Attorney, Agent, or Firm* — Dickstein Shapiro LLP

(57) ABSTRACT

This invention relates to a moisture resistant cord plate for a photovoltaic module, methods of manufacturing photovoltaic modules, and methods for generating electricity from photovoltaic modules.

34 Claims, 5 Drawing Sheets

MOISTURE RESISTANT CORD PLATE FOR A PHOTOVOLTAIC MODULE

CLAIM OF PRIORITY

This application claims priority under 35 U.S.C. §119(e) to U.S. Provisional Patent Application Ser. No. 61/360,256 filed on Jun. 30, 2010, which is hereby incorporated by reference in its entirety.

TECHNICAL FIELD

This invention relates to a moisture resistant cord plate for a photovoltaic module, methods of manufacturing photovoltaic modules, and methods for generating electricity from photovoltaic modules.

BACKGROUND

In a photovoltaic module, proper adhesion of a cord plate to a cover plate is an essential aspect of product durability. However, adhesion can be frustrated by environmental factors including moisture, temperature, wind, and ultraviolet degradation. Without proper adhesion between the cord plate and the cover plate, the module may be susceptible to moisture ingress and potential failure. In addition, improperly sealed access holes for wire routing may further increase susceptibility to moisture ingress. Sealing issues may also arise from unsecured wires that impose lever forces serving to dislodge the cord plate from the cover plate.

DETAILED DESCRIPTION

Figure 1:
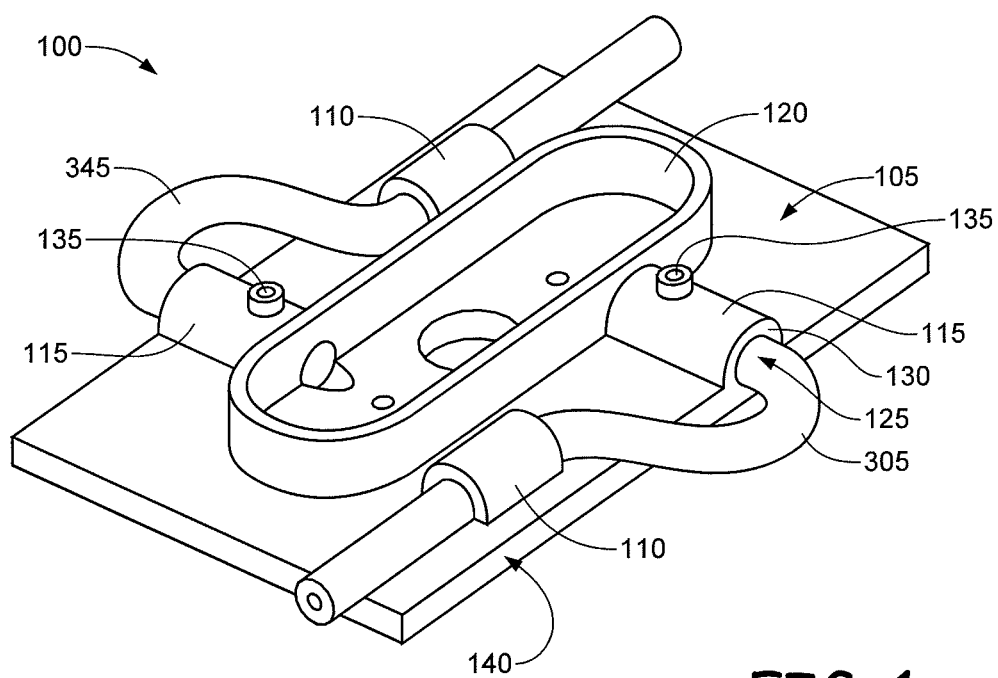
FIG. 1 is a perspective view of a cord plate.

A photovoltaic module, also known as a solar panel, may be a component in a larger photovoltaic system that generates electricity for commercial or residential applications. Since a single photovoltaic module may only produce a limited amount of power, installations often contain many modules connected to form an array. At a minimum, the array of photovoltaic modules may be wired to an inverter and a battery to complete the system.

To form an array, modules may be wired to adjacent modules in series and parallel connections. Each module may include a cord plate attached to a cover plate. The cord plate may function as a junction box on the rear surface of each module, thereby permitting interconnection of the modules. The cord plate, often polycarbonate, may be attached to the cover plate with an adhesive, foam tape, or both. The cover plate may be a transparent protective material such as borosilicate glass, soda lime glass, or polycarbonate. The cover plate may also be a non-transparent material such as Coveme's APYE, 3M's polymeric back sheet materials, or modified polycarbonate. The cover plate serves as a protective cover for the rear surface of the module.

Before a new photovoltaic module can be offered for sale, it must pass a series of physical tests. For instance, the module must be resistant to mechanical damage during manufacture, transport, installation, and use. In addition, the module must be resistant to weather including rain, wind, hail, and snow. If the module is not resistant to moisture, corrosion of metallic connections may occur, thereby decreasing the useful life of the module. Accordingly, water vapor transport rate (WVTR) is a key design factor. In one aspect, the properties of the pottant and attachment system may be tailored to match system requirements. For example, at least one component should have a WVTR less than 25 g/m2/day at 85 C and 100 RH.

To achieve Underwriters Laboratories' (UL) certification, the module must pass a wet hi-pot test where the module is submerged. In addition, the module must pass a wet test where a jet of water is sprayed at the electrical connections and outer surfaces of the module. Since the cord plate houses several electrical connections, the cord plate is often targeted by the jet of water. Therefore, it is desirable to have a moisture resistant cord plate. Accordingly, a new moisture resistant cord plate was designed and is described herein.

In one aspect, a cord plate for a photovoltaic module may include a top surface, a conductor retainer located on the top surface, a bottom surface, a conductor housing located on the top surface, and a channel configured to receive a flowable sealant. The channel may pass from the top surface to the bottom surface. The channel may also be connected to an inner surface of the conductor housing. The conductor housing may also contain a seal extending around its inner surface. In addition, the conductor housing may have a two-piece construction. For example, the conductor housing may have a wire cradle and a cap. The wire cradle may be attached to the cap by a hinge. Alternately, the cap may be detachable from the wire cradle.

In another aspect, a method for attaching a cord plate to a photovoltaic module may include providing a cord plate, a first conductor, and a cover plate. The cord plate may include a top surface, a bottom surface, a conductor retainer located on the top surface, a conductor housing located on the top surface, and a channel configured to receive a flowable sealant. The channel may extend from the top surface to the bottom surface of the cord plate. The channel may also be connected to an inner surface of the conductor housing. The first conductor may include a first end, a second end, and a central region located between the first end and the second end. The cover plate may include a first surface and a second conductor coupled to the first surface. The cover plate may be a transparent protective material such as borosilicate glass, soda lime glass, plastic, LEXAN 500 Resin, etc.

In another aspect, the method of attaching the cord plate, cover plate, first conductor, and second conductor may begin by positioning the bottom surface of the cord plate against the first surface of the cover plate. Then, the first end of the first conductor may be inserted into the conductor housing and connected to the second conductor. For example, the first conductor may be soldered or brazed to the second conductor. Alternately, the first conductor may be attached by a clip or a compression fitting to the second conductor. Subsequently, the central region of the first conductor may be secured by the conductor retainer. Once the first conductor is secured, a flowable sealant may be introduced into the channel and allowed to flow into the space between the first conductor and the inner surface of the conductor housing. The flowable sealant may then be allowed to cure.

In another aspect, a method for generating electricity may include illuminating a photovoltaic module with light to generate a photocurrent and collecting the generated photocurrent. The module may include a cord plate, and the cord plate may include a top surface, a conductor retainer located on the top surface, a bottom surface, a conductor housing located on the top surface, and a channel configured to receive a flowable sealant. The channel may pass from the top surface to the bottom surface. The channel may also be connected to an inner surface of the conductor housing. The conductor housing may also contain a seal extending around its inner surface. In addition, the conductor housing may have a two-piece construction. For example, the conductor housing may have a wire cradle and a cap. The wire cradle may be attached to the cap by a hinge. Alternately, the cap may be detachable from the wire cradle.

Figure 2:
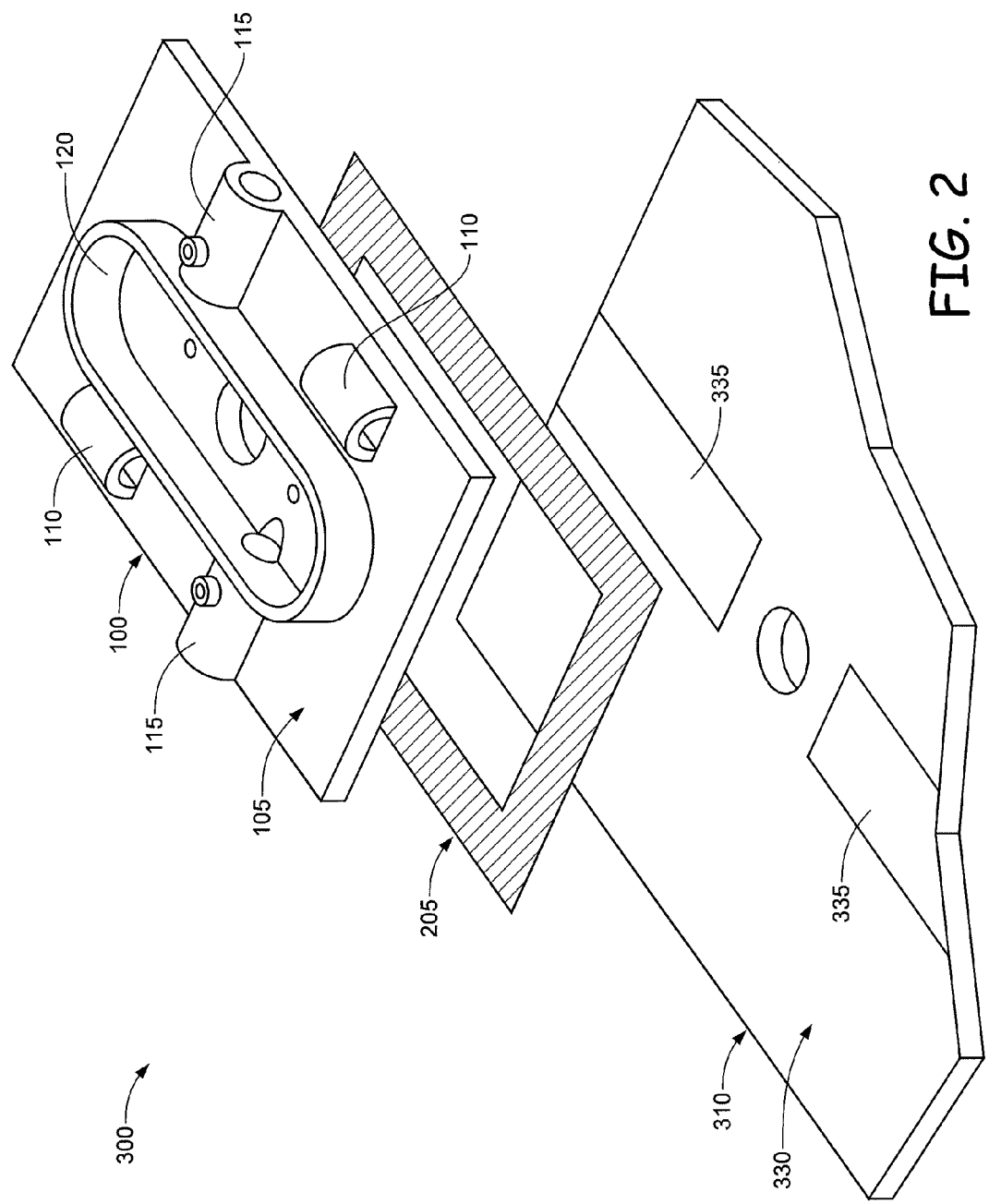
FIG. 2 is an exploded view of a photovoltaic module.
Figure 3:
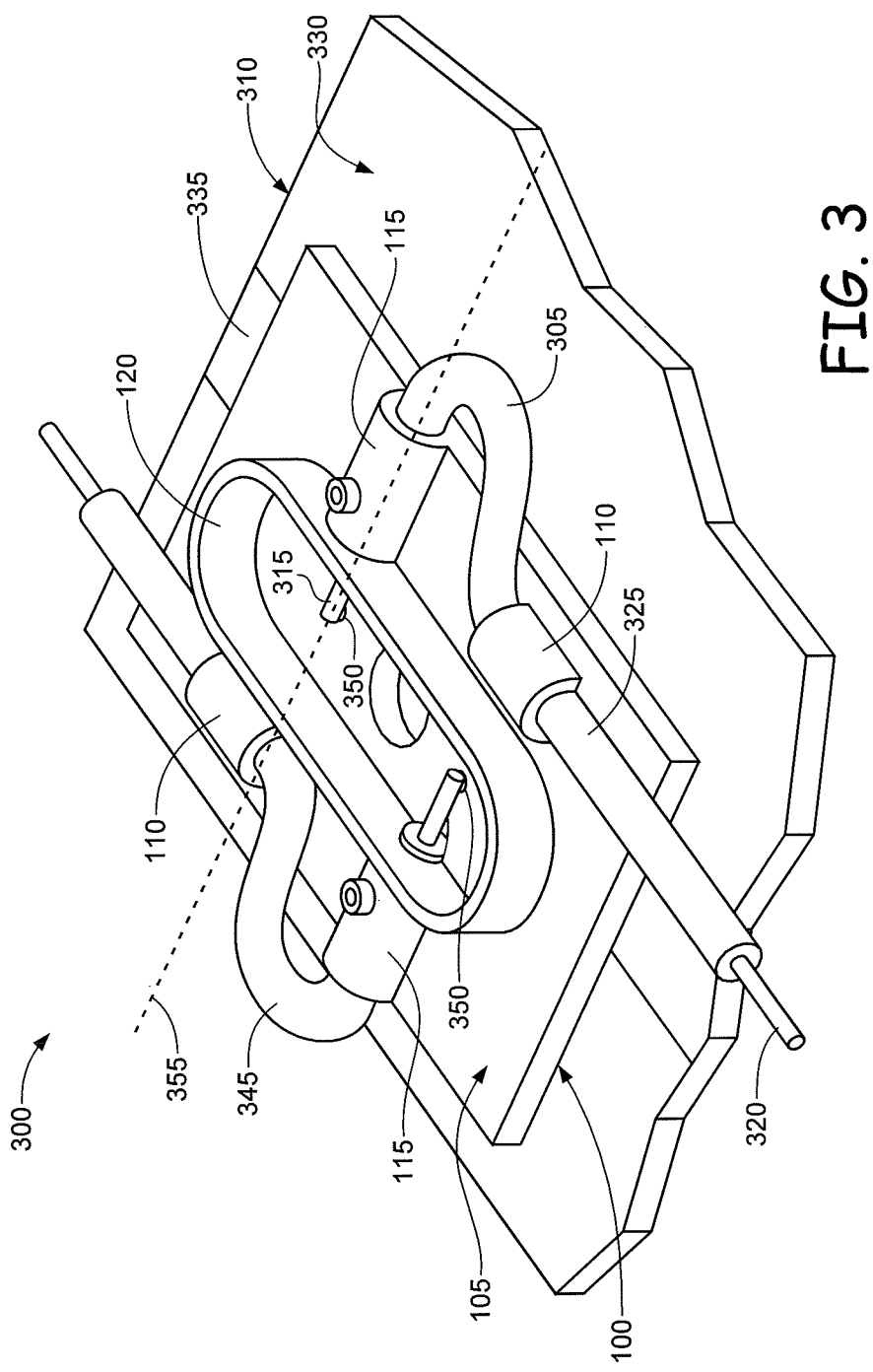
FIG. 3 is a perspective view of a photovoltaic module.

As shown in FIGS. 1, 2, and 3, a cord plate 100 may be a component of a photovoltaic module 300. For example, the cord plate 100 may be attached to a cover plate 310 of a photovoltaic module 300 and may facilitate connecting external conductors (e.g. 305, 345) to the photovoltaic module 300. In this way, the cord plate 100 allows a photovoltaic module 300 to be connected to electrical transmission lines, inverters, electrical storage units, other photovoltaic modules, etc. The cord plate 100 may be connected to electrical devices using any suitable conductor. As shown in FIG. 3, a first conductor 305 may include a first end 315, a second end 320, and a central region 325 between the first and second ends. For example, the first conductor 305 may be an insulated copper wire. Alternately, the first conductor 305 may be any suitable material or construction capable of transmitting electricity.

Figure 4:
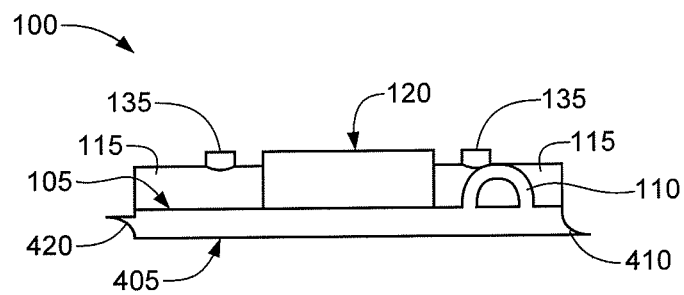
FIG. 4 is an end view of a cord plate.

As shown in FIGS. 1 and 4, a cord plate 100 may include a top surface 105, bottom surface 405, a conductor retainer 110 located on the top surface 105, a conductor housing 115 located on the top surface 105, and a channel 120 configured to receive a flowable sealant. The cord plate 100 may also include an concave surface 410 connecting the top surface 105 to the bottom surface 405. This concave surface 410 may prevent water from penetrating the seal formed between the cord plate 100 and the first surface of the cover plate 310. The cord plate 100 may be constructed from polycarbonate, plastic, resin, wood, rubber, or any other suitable material.

To facilitate adherence between the bottom surface 405 of the cord plate 100 and the first surface of the cover plate 330, a base seal 205 may be inserted between the cord plate 100 and the cover plate 310. The base seal 205 may be any suitable material including rubber, cork, acrylic foam, pressure sensitive adhesive, etc. For example, the base seal 205 may be an acrylic foam tape such as 3M VHB Acrylic Foam Tape (product number 5952), or 3M FAST Acrylic Foam Tape. Alternately, the base seal 205 may be liquid-based adhesive such as silicone, polyurethane, epoxy, or any other suitable liquid adhesive. Before the base seal 205 is inserted between the cord plate 100 and cover plate 310, one or more contacting surfaces may be primed or otherwise treated to improve adhesion. For example, surface contamination may be removed using a cleaner such as isopropyl alcohol. Next, the bottom surface of the cord plate may be flame treated to improve adhesion. Also, a liquid primer may be employed to treat the mating surfaces.

Since the cord plate 100 houses electrical connections, it is important that the cord plate be resistant to water ingress. Therefore, improving adhesion between the cord plate 100 and the cover plate 310 is desirable. Also, it is desirable to seal all openings on any outer surfaces of the cord plate 100 as well as reducing all external forces acting on the cord plate 100 that may dislodge it from its mounting position. For example, unsecured wires may create an upward lever force on the cord plate 100 that may act to separate it from the cover plate 310. By securing wires directly to the cord plate 100, upward lever forces can be avoided and the longevity and durability of the adhesion formed between the cord plate 100 and cover plate 310 may be improved.

Figure 5:
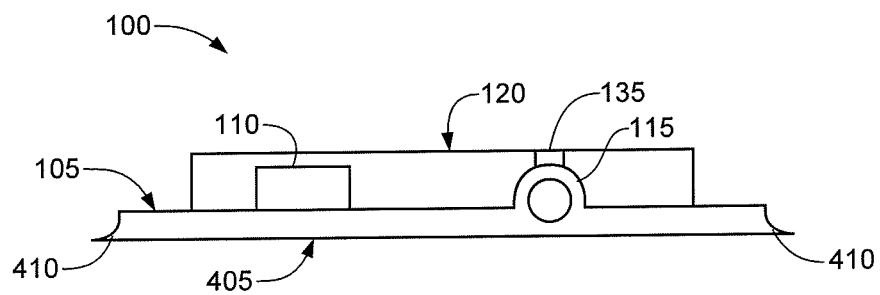
FIG. 5 is a side view of a cord plate.
Figure 7:
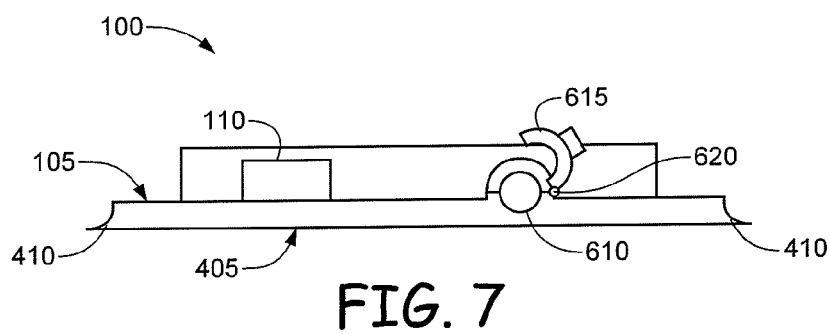
FIG. 7 is a side view of a cord plate with a two-piece conductor housing.

To further protect against water ingress, the cord plate 100 may include a concave surface 410 around its perimeter, as shown in FIGS. 4, 5, and 7. For example, the bottom surface 405 may extend beyond the top surface 105 as shown in FIG. 5. In other words, the surface area enclosed by the perimeter of the bottom surface 405 may be greater than the surface area enclosed by the perimeter of the top surface 105. The concave surface 410 may restrict moisture from penetrating the seal between the cord plate 100 and cover plate 310. For example, if a water jet is directed at the seal, the concave surface 410 may deflect water away from the seal, thereby improving the longevity of the seal.

Alternately, the cord plate 100 may include an undercut surface 420 around its perimeter. For example, the top surface 105 may extend beyond the bottom surface 405 as shown on the left side of FIG. 4. In other words, the surface area enclosed by the perimeter of the top surface 105 may be greater than the surface area enclosed by the perimeter of the bottom surface 405. The undercut surface 410 may restrict moisture accumulating on the cover plate 310 from reaching the top surface 105 of the cord plate 100 and thereby inhibit moisture from accessing electrical connections. For example, rain droplets accumulating on the first surface 330 of the cover plate 310 may be prevented from migrating to the top surface 105 of the cord plate 100 by the undercut surface 420. Instead, rain water may be more likely to bead and follow the undercut surface 420 away from electrical connections 350. The undercut surface may act as a fillet guild to apply sealant material having a low WVTR, thereby increasing break through time. A sealant fillet proximate to the undercut surface 420 may improve adhesion of the cord plate to the cover plate. The undercut surface 420 may be concave, convex, planar, or any combination thereof. The undercut surface 420 may extend around the entire perimeter of the cord plate 100, or it may extend around a portion of the perimeter as shown in FIG. 4.

The cord plate 100 may include a channel 120 located along its top surface 105 and passing down through bottom surface 405 of the cord plate 100. When the cord plate 100 is installed on the cover plate 310, the channel 120 may provide access to the cover plate 310 and thereby enable joining of conductors. For example, the channel 120 may provide access for an electrician to solder the first conductor 305 to the second conductor 335. As a result, the channel 120 may simplify installation.

The channel 120 may accommodate a plurality of bypass diodes connected in parallel to the solar cells. That way, if a cell becomes reverse biased due to a mismatch in short-circuit current between series connected cells, the bypass diode provides an alternate current path around the reverse biased cell. By doing so, the bypass diode protects other cells in the module from being damaged as a result of partial shading, a broken cell, or a cell string failure.

After the conductors are adequately connected and secured, the channel 120 is filled with flowable sealant to keep moisture from penetrating internal surfaces of the photovoltaic module 300. Upon curing, the flowable sealant provides a means of adhering the cord plate 100 to the cover plate 310. The flowable sealant may include a silicone rubber compound such as a room temperature vulcanizing (RTV) silicone. Alternately, the flowable sealant may include acrylic, polysulfide, butyl polymer, or polyurethane. In addition, the flowable sealant may be a one-component, two-component, or higher-component sealant.

The channel 120 may extend to the inner surface 125 of the conductor housing 115. By connecting the channel 120 to the inner surface 125 of the conductor housing 115, flowable sealant can travel from the channel 120 to the conductor housing 115. Once the flowable sealant reaches the inner surface 125 of the conductor housing 115, it fills the space between the conductor 305 and the inner surface 125 of the conductor housing 125. Once cured, the sealant provides support to the conductor 305 and prevents moisture from entering the photovoltaic module 300 through the conductor housing 115. By having a single injection point for flowable sealant, installation time can be decreased. Similarly, two or more injection points may be included in combination with two or more vent holes to further speed the installation process.

The conductor housing 115 may be configured to receive a first conductor 305. The conductor housing 115 may be located on a top surface 105 of the cord plate 100 and may have an annular opening that provides access to the channel 120 located near a midpoint of the cord plate 100. The first conductor 305 may be inserted into the conductor housing 115 until the first end 315 of the conductor 305 protrudes into the channel 120. Once inserted into the conductor housing 115, the first conductor 305 may be joined to a second conductor 335 attached to the cover plate 310. The second conductor 335 may be a foil strip, wire, or any other suitable conductor. The two conductors (e.g. 305, 335) may be joined by accessing the conductors through the channel 120. For example, an electrician may insert a soldering tool into the channel 120 and created a soldered connection between the first conductor 305 and the second conductor 335. Alternately, any suitable means of joining the first conductor 305 to the second conductor 335 may be employed.

The inner surface 125 of the conductor housing 115 may provide support to a top surface 105 and a bottom surface 405 of the conductor 305 and thereby restricts movement of the conductor 305. By providing support to the outer surfaces of the conductor 305, the conductor 305 remains in a desired position during the introduction of flowable sealant. Conversely, if the conductor 305 is not supported along its outer surfaces during installation, the conductor 305 may be prone to twisting before the flowable sealant has an opportunity to cure. Therefore, to ensure adequate support of the conductor 305, the conductor housing 115 may provide support around the outer surface of the conductor 305 extending at least 5 mm along an axis 355 of the conductor 305. Preferably, the conductor housing 115 provides support around the outer surface of the conductor 305 extending at least 10 mm along the axis 355 of the conductor 305.

The conductor housing 115 may also contain a seal 605 extending around a circumference of the inner surface 125. The inner diameter of the seal 605 may be smaller than the outer dimension of the conductor 305 to ensure a moisture resistant friction fit. For example, the seal 605 may be a rubber o-ring that forms a tight seal against the outer sheath of an insulated wire to protect against water ingress. Alternately, the seal 605 may be any suitable material or configuration to combat water ingress.

The seal 605 also provides a barrier during the injection of the flowable sealant. For example, when the sealant is injected into the channel 120, it will travel to the inner surface 125 of the conductor housing 115. If no seal 605 is present, the sealant will ooze out of an end 130 of the conductor housing 115. This is undesirable since the installer must spend time removing the excess sealant from the end 130 of the conductor housing 115 and the conductor 305. In turn, installation time increases. To avoid this problem, the seal 605 may be included around the inner surface 125 of the conductor housing 115. In addition, a vent hole 135 may be included that provides an open passage from the inner surface 125 of the conductor housing 115 to an outer surface of the conductor housing 115. The vent hole 135 permits air to escape as flowable sealant fills the conductor housing 115. For instance, when flowable sealant enters the conductor housing 115, the seal 605 restricts the sealant from discharging from the end 130 of the conductor housing 115. Instead, the air and excess sealant are forced out of the housing 115 through the vent hole 135. Thereafter, the installer can simply wipe excess sealant from the vent hole 135 resulting in an aesthetically appealing installation.

Figure 6:
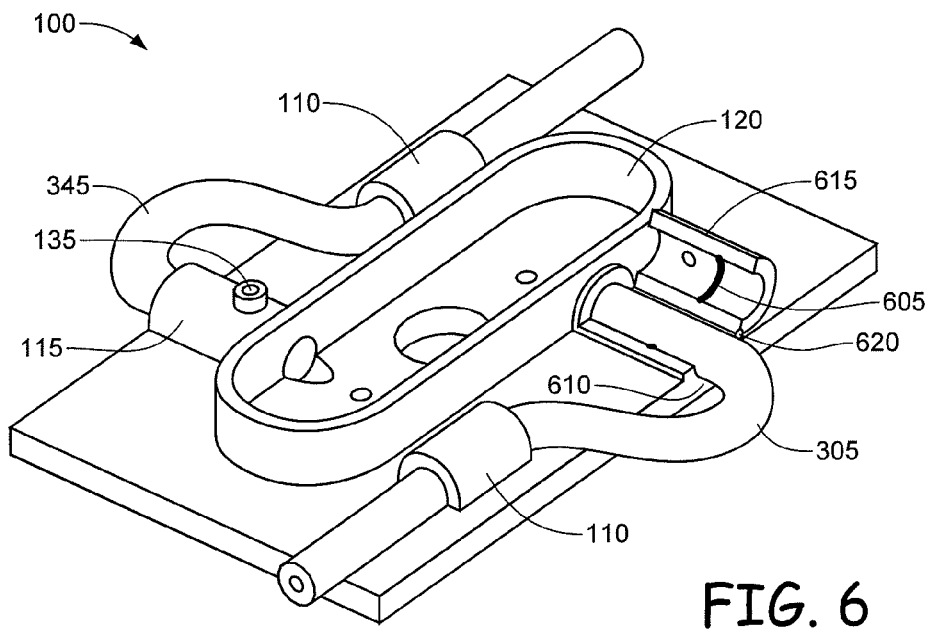
FIG. 6 is a perspective view of a cord plate with a two-piece conductor housing.

The conductor housing 115 may include a two-piece construction including a wire cradle 610 and a cap 615 as shown in FIGS. 6 and 7. The wire cradle 610 may be attached to the cap 615 by a hinge 620. Alternately, the cap 615 may be detachable from the wire cradle 610. The two-piece construction may facilitate ease of installation and protection of the seal 605 during installation. For example, if a seal 605 is contained within the conductor housing 115, the cap 615 may be opened to allow the first conductor 305 to be soldered to the second conductor 335 more easily. For instance, an electrician may prefer to retain the ability to maneuver the wire during the soldering process. By employing a two-piece construction where the cap 615 is separable from the cradle 610, the electrician can maneuver the conductor 305 during soldering as desired. Once soldering is complete, the cap 615 can be closed and the seal 605 engaged against the outer sheath of the insulted wire. In this way, the seal 605 is not damaged during installation and ease of installation is not impaired.

The conductor 305, connected to the cord plate 100 via the conductor housing 115, should be secured along its central region 325. If the conductor 305 is not secured, an external force acting on the conductor 305 may result in a force being transmitted to the seal formed between the cord plate 100 and cover plate 310. For example, a loose conductor 305 may create an upward arching loop which may catch on a worker's boots or tools during installation or inspection. As a result, the seal between the cord plate 100 and cover plate 310 may be broken and moisture may enter the photovoltaic module 300. Therefore, it is desirable to secure the conductor 305 along its central region 325 to minimize movement or rotation. Securing the conductor 305 can be accomplished with a conductor retainer 110.

The conductor retainer 110 may be located on the top surface 105 of the cord plate 100. The conductor retainer 110 may be configured to receive and secure a conductor 305. For example, the conductor retainer 110 may be a mechanical clip that secures a portion of an insulated copper wire. Alternately, the conductor retainer 110 may be a hook, tie, latch, lock, or any other suitable retainer capable of securing the conductor 305. The retainer 110 may be integrated into the top surface 105 and/or a side surface 140 of the cord plate 100. For example, the conductor retainer 110 may be an open slot in a rib that is positioned on the top surface 105 of the cord plate 100. Alternately, the retainer 110 may be a separate component fastened to the top surface 105 and/or the side surface 140 of the cord plate 100.

The conductor 305 may be arranged in any suitable manner such that a central region 325 of the conductor 305 is secured by the conductor retainer 110. For instance, the conductor may exit a conductor housing 115 on one side of the cord plate 100 and be secured by a conductor retainer 110 located on the same side of the cord plate 100 as shown in FIG. 1. Alternately, the conductor may exit a conductor housing 115 on one side of the cord plate 100 and be secured by a conductor retainer 110 located on an adjacent or opposite side of the cord plate 100. The cord plate 100 may include one, two, or more conductors, conductor retainers, and conductor housings.

After the first conductor 305 is secured, the flowable sealant may be introduced into the channel 120. The channel 120 is configured to provide a passage from the top surface 105 to the bottom surface 405 of the cord plate 100 and to an inner surface 125 of the conductor housing 115. Upon injection, these passages allow the sealant to disperse throughout the interior of the cord plate 100 thereby displacing air and providing sealing of external orifices. In addition, the sealant flows toward the perimeter of the cord plate 100 providing bonding between the cord plate 100 and the cover plate 310. Since the channel 120 is connected to the inner surface 125 of the conductor housing 115, flowable sealant enters the conductor housing 115. As discussed above, upon entering the conductor housing 115, the flowable sealant displaces air and provides a moisture resistant seal between the conductor 305 and the inner surface 125 of the conductor housing 115. Air and excess sealant are permitted to escape through a vent hole 135.

Details of one or more embodiments are set forth in the drawings and description. Other features, objects, and advantages will be apparent from the description, drawings, and claims. Although a number of embodiments of the invention have been described herein, it will be understood that various modifications may be made without departing from the spirit and scope of the invention. In particular, steps depicted in the figures may be executed in orders differing from the orders depicted. For example, steps may be performed concurrently or in alternate orders from those depicted. It should also be understood that the appended drawings are not necessarily to scale, presenting a somewhat simplified representation of various features and basic principles of the invention.

What is claimed is:

1. A cord plate for a photovoltaic module, comprising:
a top surface;
a bottom surface;
a conductor retainer located on the top surface;
a conductor housing located on the top surface, wherein the conductor housing further comprises a wire cradle and a cap; and
a channel extending from the top surface to the bottom surface,
wherein the channel is configured to receive a flowable sealant, and
wherein the channel connects to an inner surface of the conductor housing.

2. A cord plate according to claim 1, further comprising a side surface connecting the top surface to the bottom surface.

3. The cord plate according to claim 2, wherein the side surface is concave.

4. A cord plate according to claim 1, wherein the cap contains a vent hole.

5. A cord plate according to claim 1, wherein the cap is attached to the wire cradle by a hinge.

6. A cord plate according to claim 1, wherein the cap is detachable from the wire cradle.

7. A cord plate according to claim 1, wherein the cap is attached to the wire cradle by a clip.

8. A cord plate according to claim 1, wherein the conductor housing further comprises:
a seal on the inner surface,
wherein the seal extends around the inner surface.

9. A cord plate according to claim 1, wherein the conductor retainer is integrated into the top surface of the cord plate.

10. A cord plate according to claim 1, wherein the conductor retainer is fastened to the top surface of the cord plate.

11. A cord plate according to claim 1, wherein the conductor retainer is a wire clip.

12. A cord plate according to claim 1, wherein the conductor housing is at least 5 mm in length.

13. A photovoltaic module, comprising:
a cord plate, comprising:
a top surface;
a bottom surface;
a conductor retainer located on the top surface;
a conductor housing located on the top surface, wherein the conductor housing further comprises a wire cradle and a cap; and
a channel extending from the top surface to the bottom surface,
wherein the channel is configured to receive a flowable sealant, and
wherein the channel connects to an inner surface of the conductor housing;
a first conductor, comprising:
a first end;
a second end; and
a central region located between the first end and the second end;
a cover plate, comprising:
a first surface; and
a second conductor coupled to the first surface
wherein the bottom surface of the cord plate is mated to the first surface of the cover plate,
wherein the first end of the first conductor is inserted into the conductor housing,
wherein the first end of the first conductor is connected to the second conductor,
wherein the central region of the first conductor is secured by the conductor retainer,
wherein a flowable sealant is introduced into the channel.

14. A photovoltaic module according to claim 13, further comprising:
a side surface connecting the top surface to the bottom surface,
wherein the side surface is concave.

15. A photovoltaic module according to claim 13, wherein the cap contains a vent hole.

16. A photovoltaic module according to claim 13, wherein the cap is attached to the wire cradle by a hinge.

17. A photovoltaic module according to claim 13, wherein the conductor housing further comprises:
a seal on the inner surface,
wherein the seal extends around the inner surface.

18. A method for attaching a cord plate to a photovoltaic module, comprising:
providing a cord plate, comprising:
a top surface;
a bottom surface;
a conductor retainer located on the top surface;
a conductor housing located on the top surface, wherein the conductor housing further comprises a wire cradle and a cap; and
a channel extending from the top surface to the bottom surface;

wherein the channel is configured to receive a flowable sealant, and wherein the channel connects to an inner surface of the conductor housing;

providing a first conductor, comprising:
a first end;
a second end; and
a central region located between the first end and the second end;

providing a cover plate, comprising:
a first surface; and
a second conductor coupled to the first surface;

positioning the bottom surface of the cord plate against the first surface of the cover plate;

inserting the first end of the first conductor into the conductor housing;

connecting the first end of the first conductor to the second conductor;

securing the central region of the first conductor with the conductor retainer;

introducing a flowable sealant into the channel.

19. A method according to claim 18, wherein the cord plate further comprises:
a side surface connecting the top surface to the bottom surface,
wherein the side surface is concave.

20. A method according to claim 18, wherein the cap contains a vent hole.

21. A method according to claim 18, wherein the cap is attached to the wire cradle by a hinge.

22. A method according to claim 18, wherein the cap is attached to the wire cradle by a clip.

23. A method according to claim 18, wherein the conductor housing further comprises:
a seal on the inner surface, wherein the seal extends around the inner surface.

24. A method for generating electricity, the method comprising:
illuminating a photovoltaic module with light to generate a photocurrent; and
collecting the photocurrent, wherein the photovoltaic module comprises a cord plate, and wherein the cord plate comprises:
a top surface;
a bottom surface;
a conductor retainer located on the top surface;
a conductor housing located on the top surface, wherein the conductor housing further comprises a wire cradle and a cap; and
a channel extending from the top surface to the bottom surface,
wherein the channel is configured to receive a flowable sealant, and
wherein the channel connects to an inner surface of the conductor housing.

25. The method of claim 24, wherein the cord plate further comprises a side surface connecting the top surface to the bottom surface, wherein the side surface is concave.

26. A method according to claim 24, wherein the cap contains a vent hole.

27. The method of claim 24, wherein the cap is attached to the wire cradle by a hinge.

28. The method of claim 24, wherein the cap is attached to the wire cradle by a clip.

29. The method of claim 24, wherein the cap is detachable from the wire cradle.

30. The method of claim 24, wherein the conductor housing further comprises a seal on the inner surface,
wherein the seal extends around the inner surface.

31. The method of claim 24, wherein the conductor retainer is integrated into the top surface of the cord plate.

32. The method of claim 24, wherein the conductor retainer is fastened to the top surface of the cord plate.

33. The method of claim 24, wherein the conductor retainer is a wire clip.

34. The method of claim 24, wherein the conductor housing is at least 5 mm in length.

* * * * *